United States Patent Office 3,064,019
Patented Nov. 13, 1962

3,064,019
PROCESS FOR THE PRODUCTION OF COMPOUNDS OF POLYVALENT METALS WITH POLYCHLOROPHENOLS AND HIGHER CARBOXYLIC ACIDS
Otto Pauli and Dieter Bauer, Krefeld-Bockum, Germany, assignors to Farbenfabriken Bayer Aktiengesellschaft, Leverkusen, Germany, a corporation of Germany
No Drawing. Filed May 27, 1960, Ser. No. 32,118
Claims priority, application Germany June 6, 1959
15 Claims. (Cl. 260—414)

The present invention is concerned with a process for the production of compounds of a polyvalent metal, a polychlorophenol, and a higher carboxylic acid.

It is known to produce compounds of polyvalent metals with polychlorophenols and carboxylic acids which, because of their excellent fungicidal, bactericidal, insecticidal and herbicidal action, their good solubility in organic solvents, especially in hydrocarbons, their very low leachability, their non-fluidity and chemical stability, are valuable protective materials for, for example, wood, by heating a mixture of a non-volatile carboxylic acid, a polychlorophenol, an oxide, hydroxide or salt of a volatile acid of a polyvalent metal and an organic solvent and distilling off the liberated water of reaction or liberated volatile acid.

We have found that the compounds mentioned can be produced in a technically easier and simpler manner by mixing an aqueous solution of about 1 mol of a water-soluble salt of a polychlorophenol and of about 1 mol of a water soluble salt of a higher carboxylic acid with an aqueous solution of an equivalent amount of a water-soluble salt of a polyvalent metal at room temperature or slightly elevated temperatures, for example, up to about 60° C., and optionally in the presence of an organic solvent.

In this process heating and distilling off of water or of a volatile acid is not necessary.

If the reaction is carried out in the absence of an organic solvent, the metal compound to be produced precipitates out as a crystalline material after the addition of the third reaction component. If the reaction is carried out in the presence of an organic solvent a solution of the compound to be produced is obtained directly in the organic solvent which only needs to be separated from the aqueous phase.

Examples of water-soluble salts of the polychlorophenols are the alkali-metal salts of 2,4-dichlorophenol, 2,4,5- and 2,4,6-trichlorophenol, tetrachlorophenol, and especially pentachlorophenol, such as the lithium, sodium and potassium salts.

Examples of water-soluble salts of higher carboxylic acids are the alkali-metal salts of benzoic acid, p-chlorobenzoic acid, lauric acid, oleic acid, stearic acid, naphthenic acid and tall oil fatty acids. In general, it is preferable to use the salts of those acids which are themselves biologically active, such as those of benzoic acid, chlorobenzoic acid and naphthenic acid.

As suitable water-soluble salts of polyvalent metals here may be mentioned, by way of example, zinc chloride and sulphate, cadmium chloride and sulphate, copper chloride and sulphate, barium chloride, aluminum chloride and sulphate, cerium sulphate, lead nitrate, manganese chloride and sulphate and nickel chloride and sulphate.

Organic solvents which may be used if desired, are, for example, solvent naphtha, test benzine and light coal tar oil.

The following examples are given for the purpose of illustrating the present invention.

Example 1

28.8 grams (0.1 mol) sodium pentachlorophenolate and 25.5 grams (0.1 mol) sodium naphthenate are dissolved in 250 milliliters water. A solution of 28.7 grams (0.1 mol) crystalline zinc sulphate in 100 milliliters water is added at room temperature with stirring to this solution. The yield is quantitative. The white precipitate is very easily soluble in light coal tar oil (B.P. 200–300° C.) and is about 5 percent soluble in solvent naphtha.

Example 2

43.2 grams (0.15 mol) sodium pentachlorophenolate and 38.5 grams (0.15 mol) sodium naphthenate are dissolved in 400 milliliters water. A solution of 25 grams (about 0.1 mol) crystalline aluminum chloride in 200 milliliters water is added at room temperature to this mixture. The precipitation is quantitative. The white precipitate is soluble to about 6 percent in solvent naphtha and test benzine. It is very easily soluble in light coal tar oil.

Example 3

28.8 grams sodium pentachlorophenolate and 31.7 grams sodium oleate (approximately 0.11 mol) are dissolved in 300 milliliters water. A solution of 25 grams copper sulphate (0.1 mol $CuSO_4.5H_2O$) in 100 milliliters water is added at room temperature to this mixture. The reaction proceeds quantitatively. The black-brown precipitate is about 20 percent soluble in light coal tar oil and about 15 percent soluble in solvent naphtha or test benzine.

Example 4

28.8 grams sodium pentachlorophenolate and 14.5 grams sodium benzoate (0.1 mol) are dissolved in 300 milliliters water. A solution of 25 grams copper sulphate in 100 milliliters water is added at room temperature to this mixture. The bright red-brown precipitate is about 20 percent soluble in light coal tar oil.

Example 5

44.0 grams sodium trichlorophenolate (0.2 mol) and 51 grams sodium naphthenate (0.2 mol) are dissolved in 400 milliliters water. 700 milliliters solvent are added to this mixture and a solution of 50 grams copper sulphate (0.2 mol) in 200 milliliters water allowed to run in with stirring at room temperature. The reaction product is completely soluble in the above mentioned amount of solvent naphtha.

Example 6

28.8 grams sodium pentachlorophenolate and 25.5 grams sodium naphthenate are dissolved in 300 milliliters water. 130 milliliters light coal tar oil (B.P. 200–300° C.) are added to this mixture and then a solution of 25 grams copper sulphate and 100 milliliters water is allowed to run in with stirring at room temperature. The reaction product is completely soluble in the coal tar oil. An approximately 30 percent solution of pentachlorophenol-copper naphthenate is obtained.

We claim:
1. A process for the production of a compound of a polyvalent metal, a polychlorophenol, and a higher carboxylic acid which comprises mixing an aqueous solution of approximately equimolecular amounts of a water-soluble salt of a polychlorophenol selected from the group consisting of the lithium, sodium, and potassium salts of 2,4-dichlorophenol, 2,4,5- and 2,4,6-trichlorophenol, tetrachlorophenol, and pentachlorophenol, a water-soluble salt of a higher carboxylic acid selected from the group consisting of the lithium, sodium, and potassium salts of benzoic acid, p-chlorobenzoic acid, lauric acid, oleic acid, stearic acid, naphthenic acid and tall oil fatty acids, and an aqueous solution of an approximately equivalent amount of a water-soluble salt of a polyvalent metal selected from the group consisting of zinc, cadmium, copper, aluminum, manganese and nickel chlorides and sulphates, barium chloride, cerium sulphate, and lead nitrate.

2. Process according to claim 1, wherein the reaction is carried out in the presence of an inert organic solvent that is immiscible with water selected from the group consisting of solvent naphtha, test benzine, and light coal tar oil.

3. Process according to claim 1, wherein the water-soluble salt of the polychlorophenol is the sodium salt of pentachlorophenol.

4. Process according to claim 1, wherein the water-soluble salt of the polychlorophenol is the sodium salt of a trichlorophenol.

5. Process according to claim 1, wherein the water-soluble salt of the higher carboxylic acid is the sodium salt of benzoic acid.

6. Process according to claim 1, wherein the water-soluble salt of the higher carboxylic acid is the sodium salt of p-chlorobenzoic acid.

7. Process according to claim 1, wherein the water-soluble salt of the higher carboxylic acid is the sodium salt of naphthenic acid.

8. Process according to claim 1, wherein the water-soluble salt of the polyvalent metal is zinc sulphate.

9. Process according to claim 1, wherein the water-soluble salt of the polyvalent metal is aluminum chloride.

10. Process according to claim 1, wherein the water-soluble salt of the polyvalent metal is copper sulphate.

11. A process for the production of a compound of a polyvalent metal, a polychlorophenol and a higher carboxylic acid, wherein an aqueous solution of 1 mol sodium pentachlorophenolate and 1 mol sodium naphthenate is mixed with an aqueous solution of 1 mol zinc sulphate.

12. A process for the production of a compound of a polyvalent metal, a polychlorophenol, and a higher carboxylic acid, wherein an aqueous solution of 1 mol sodium pentachlorophenolate and 1 mol sodium naphthenate in admixture with light coal tar oil is mixed with an aqueous solution of 1 mol copper sulphate.

13. A process for the production of a compound of a polyvalent metal, a polychlorophenol, and a higher carboxylic acid, wherein an aqueous solution of 1 mol sodium pentachlorophenolate and 1 mol sodium naphthenate is mixed with an aqueous solution of 1 mol aluminum chloride.

14. A process for the production of a compound of a polyvalent metal, a polychlorophenol, and a higher carboxylic acid, wherein an aqueous solution of 1 mol sodium pentachlorophenolate and 1 mol sodium oleate is mixed with an aqueous solution of 1 mol copper sulphate.

15. A process for the production of a compound of a polyvalent metal, a polychlorophenol, and a higher carboxylic acid, wherein an aqueous solution of 1 mol sodium pentachlorophenolate and 1 mol sodium benzoate is mixed with an aqeuous solution of 1 mol copper sulphate.

References Cited in the file of this patent
UNITED STATES PATENTS

| | | |
|---|---|---|
| 1,994,002 | Mills | Mar. 12, 1935 |
| 2,890,232 | Rogers et al. | June 9, 1959 |